US008590553B2

(12) United States Patent
Lovley, II et al.

(10) Patent No.: US 8,590,553 B2
(45) Date of Patent: Nov. 26, 2013

(54) DETENT ACTUATORS, FOLDABLE APPARATUS INCLUDING DETENT ACTUATORS, AND RELATED METHODS

(71) Applicants: Jack Lovley, II, Lake Forest, CA (US); Mark Groenhuyzen, Huntington Beach, CA (US); Ron Sy-Facunda, Thousand Oaks, CA (US)

(72) Inventors: Jack Lovley, II, Lake Forest, CA (US); Mark Groenhuyzen, Huntington Beach, CA (US); Ron Sy-Facunda, Thousand Oaks, CA (US)

(73) Assignee: Bravo Sports, Santa Fe Springs, CA (US)

( * ) Notice: Subject to any disclaimer, the term of this patent is extended or adjusted under 35 U.S.C. 154(b) by 0 days.

(21) Appl. No.: 13/627,719

(22) Filed: Sep. 26, 2012

(65) Prior Publication Data

US 2013/0092207 A1    Apr. 18, 2013

Related U.S. Application Data

(60) Provisional application No. 61/540,312, filed on Sep. 28, 2011.

(51) Int. Cl.
*E04H 15/32* (2006.01)
*E04H 15/50* (2006.01)
*E04H 15/46* (2006.01)

(52) U.S. Cl.
USPC ............. 135/120.2; 135/120.3; 135/145; 135/140; 135/142

(58) Field of Classification Search
USPC .......... 135/131, 145, 120.1, 120.2, 142, 140; 403/109.2, 109.3, 109.7; 248/163.1, 248/188.5, 354.1, 354.4–354.7, 345, 436, 248/440
See application file for complete search history.

(56) References Cited

U.S. PATENT DOCUMENTS

| | | | | |
|---|---|---|---|---|
| 3,722,702 | A * | 3/1973 | Marker, Jr. ................ | 211/204 |
| 4,329,078 | A * | 5/1982 | Crates et al. .............. | 403/316 |
| 5,421,356 | A * | 6/1995 | Lynch ....................... | 135/145 |
| 6,152,157 | A * | 11/2000 | Jang ......................... | 135/131 |
| 6,551,226 | B1 * | 4/2003 | Webber et al. ............ | 482/148 |
| 6,951,327 | B1 * | 10/2005 | Seo .......................... | 248/188 |
| 7,066,676 | B2 * | 6/2006 | Tsai ......................... | 403/109.3 |
| 7,097,380 | B2 * | 8/2006 | Lee .......................... | 403/109.2 |
| 7,409,963 | B2 * | 8/2008 | Mallookis et al. ......... | 135/144 |
| 7,836,908 | B2 * | 11/2010 | Sy-Facunda ............... | 135/145 |
| 7,849,867 | B2 * | 12/2010 | Takayama ................. | 135/114 |
| 2007/0012346 | A1 * | 1/2007 | Choi ......................... | 135/114 |
| 2009/0255564 | A1 * | 10/2009 | Xie .......................... | 135/145 |

* cited by examiner

*Primary Examiner* — David Dunn
*Assistant Examiner* — Danielle Jackson
(74) *Attorney, Agent, or Firm* — Bryan G. Pratt; Holland & Hart LLP

(57) ABSTRACT

Detent actuators may comprise an elongate arm member, a detent button actuating surface, a receiving region, and a mounting structure. The detent button actuating surface may be sized and configured to actuate a detent button. The receiving region may be sized and configured to receive at least one of a finger and a thumb. The mounting structure may be sized and configured to facilitate mounting of the elongate arm to a structure that is selectively slidable relative to a structure comprising the detent button. Additionally, foldable apparatus may comprise a post comprising a detent button, a fitting slidably coupled to the post, and a detent button actuator coupled to the fitting. Methods of operating a detent button may comprise applying a force to a receiving region of a detent button actuator and depressing the detent button with a detent button actuating surface.

25 Claims, 4 Drawing Sheets

DETENT ACTUATORS, FOLDABLE APPARATUS INCLUDING DETENT ACTUATORS, AND RELATED METHODS

RELATED APPLICATION

This application claims priority to U.S. Provisional Patent Application No. 61/540,312, filed 28 Sep. 2011, to Ron Sy-Facunda, the disclosure of which is hereby incorporated by reference in its entirety.

BACKGROUND

It is well known that various expandable and foldable apparatuses, such as lawn furniture, tables, canopies, and camping equipment, employ detents or detent buttons to connect telescoping tubes and retain movable fittings in a desired position. FIG. 1 illustrates a prior art detent button 10 which is used to connect telescoping tubes 22 and 24. Detent button 10 includes a button 12 which is attached to a spring 14. Spring 14 includes adjacent legs 15 and 16 connected with an arcuate bend. Inner tube 24 includes an aperture 27 formed in its side wall through which button 12 extends. Outer tube 22 is installed over the inner tube 24 and has a corresponding aperture 25 formed through its side wall. Spring 14 urges button 12 through both apertures 25 and 27. In order to release the telescoping tubes from each other, button 12 is manually pushed into the apertures against spring 14 until it clears at least outer tube 22. Detent buttons are also referred to as quick release button connectors, tubing buttons, detent snap buttons, and detents. While a detent button is a convenient way to connect telescoping tubes, a drawback of such a connector is that when manually pressing button 12, a user's fingertip or fingernail may become caught between apertures 25 and 27, thereby pinching, or otherwise injuring, the user's finger.

As shown in FIG. 2, detent buttons are also used in expandable structures, such as expandable canopies, to retain fittings in a particular position. For example, as shown in FIG. 2, a portion of a canopy leg is illustrated. In this example, canopy leg 26 includes a detent button 32 and its associated spring 30. Detent button 32 retains slide fitting 28 in the expanded state against a downward directed force. To collapse the canopy, detent button 32 is depressed by a user's finger 5. Once button 32 is depressed, fitting 28 moves abruptly toward the user's finger. Thus, as with telescoping tubes, releasing a slide fitting on such a canopy may result in a pinched finger or other injury. Accordingly, there is a need for a device that assists a user in depressing a detent button while minimizing the risk of injuring the user's finger.

SUMMARY

Described herein is a detent actuator comprising an elongated arm member having opposed first and second end portions. An aperture is formed in the first end portion, whereby the lever is mountable adjacent a detent button. The second end portion includes a finger receiving region and a button actuating surface.

A canopy incorporating a detent actuator lever is also described. Broadly, the detent actuator is attached to the canopy frame adjacent a slide fitting detent button. In an embodiment, the detent actuator is secured to the slide fitting about the same axis that at least one truss member is attached to the slide fitting.

In some embodiments, detent actuators may comprise an elongate arm member, a detent button actuating surface, a receiving region, and a mounting structure. The detent button actuating surface may be sized and configured to actuate a detent button. The receiving region may be sized and configured to receive at least one of a finger and a thumb. The mounting structure may be sized and configured to facilitate mounting of the elongate arm to a structure that is selectively slidable relative to a structure comprising the detent button.

In further embodiments, a foldable apparatus may comprise a post comprising a detent button, a fitting slidably coupled to the post, and a detent button actuator coupled to the fitting.

In yet further embodiments, methods of operating a detent button may comprise applying a force to a receiving region of a detent button actuator and depressing the detent button with a detent button actuating surface.

BRIEF DESCRIPTION OF THE DRAWINGS

Non-limiting and non-exhaustive embodiments of the present technology, including the preferred embodiment, are described with reference to the following figures, wherein like reference numerals refer to like parts throughout the various views unless otherwise specified.

DETAILED DESCRIPTION

Embodiments are described below with reference to the accompanying figures, which form a part hereof and show, by way of illustration, specific exemplary embodiments of the detent actuator and canopy incorporating the same. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 3:
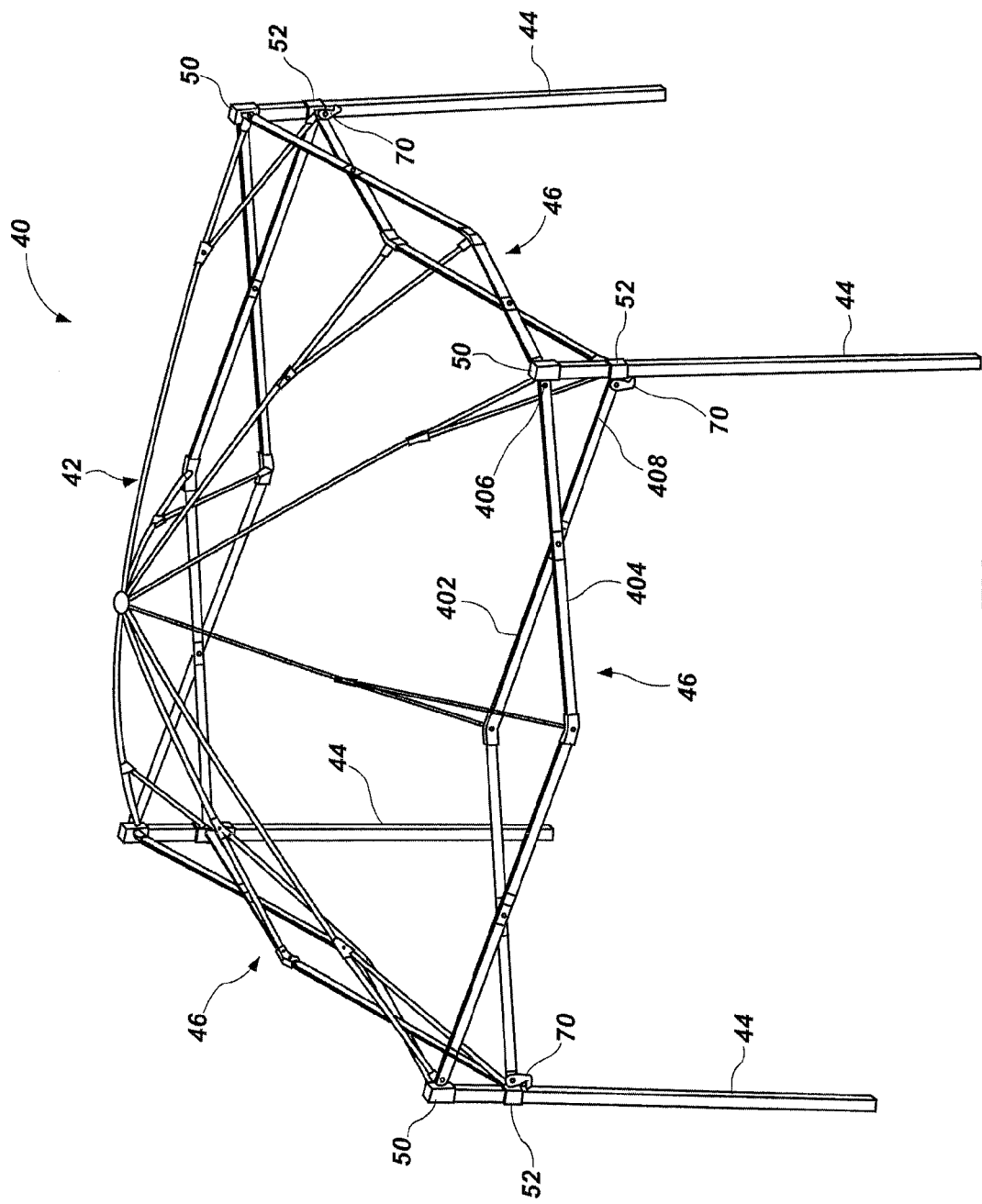
FIG. 3 is a perspective view of an expandable canopy frame incorporating a detent actuator according to an exemplary embodiment.

Expandable canopy frame 40 incorporates a detent actuator 70 according to an exemplary embodiment. As shown in FIG. 3, canopy 40 includes a plurality of corner support posts 44 which are connected by a plurality of expandable and collapsible trusses 46. Each truss 46 includes a first member 402 and a second member 404. Corner support posts 44, in conjunction with trusses 46, support roof section 42. As is known in the art, the canopy frame 40 supports a canopy cover (not shown). A representative expandable canopy is described, for example, in U.S. Pat. No. 7,836,908 issued Nov. 23, 2010 to Sy-Facunda, the disclosure of which is hereby incorporated by reference in its entirety.

Figure 4:
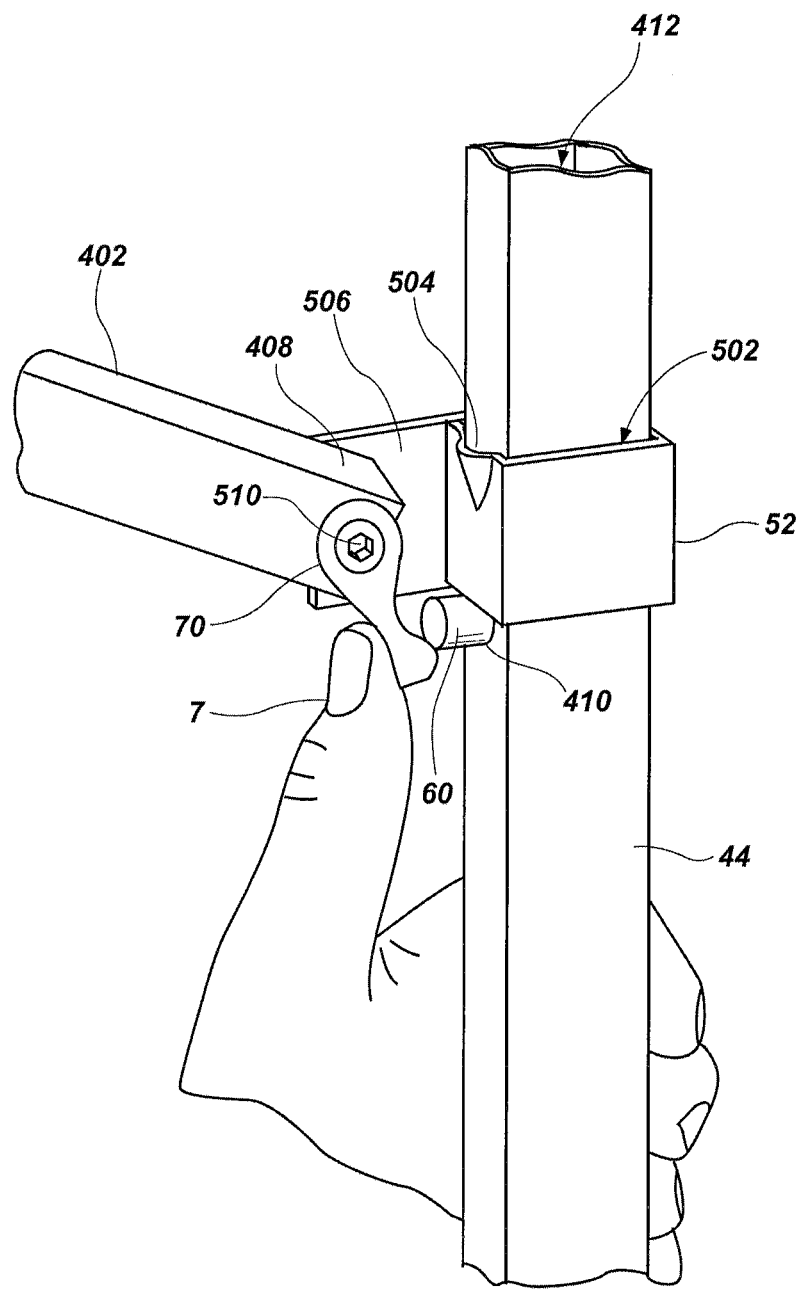
FIG. 4 is an enlarged partial perspective view of the detent actuator installed on a corner support post of the canopy frame shown in FIG. 3.

Second truss member 404 includes end portion 406 connected to a fixed, or stationary, fitting 50 that is disposed on an associated support post 44. First truss member 402 includes an end portion 408 that is connected to a slide fitting 52 disposed on support post 44. As is known in the art, the expandable canopy frame 40 is erected by sliding fittings 52 upwards along their associated support posts 44 and retaining the fittings in position with detent buttons. With further reference to FIG. 4, slide fitting 52 includes an aperture 502 which slides along corner support post 44. Corner support post 44 is hollow and includes an interior region 412 which houses a detent button 60. Detent button 60 extends through aperture 410 formed in the side wall of corner support post 44. Slide fitting 52 also includes a guide opening 504 which aids in depressing detent button 60 as slide fitting 52 is moved upward along support post 44 in conjunction with expanding the canopy frame 40. Slide fitting 52 is retained in the expanded state once slide fitting 52 has been moved beyond aperture 410 such that detent button 60 extends from aperture 410 thereby capturing slide fitting 52 in the expanded position as shown. As shown, detent button 60 extends from aperture 410 after the slide fitting 52 slides past the aperture 410. Alternatively, slide fitting 52 may include an aligned aperture.

Figure 1:
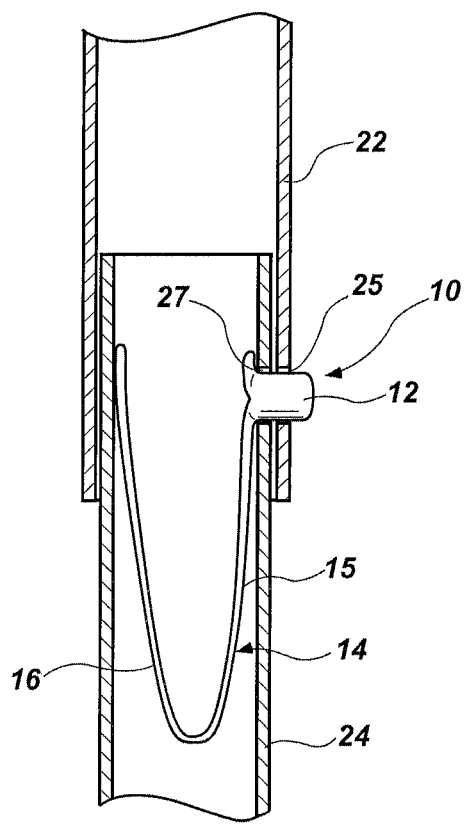
FIG. 1 is a side view in cross section illustrating a prior art telescoping tube arrangement connected with a prior art detent button.
Figure 2:
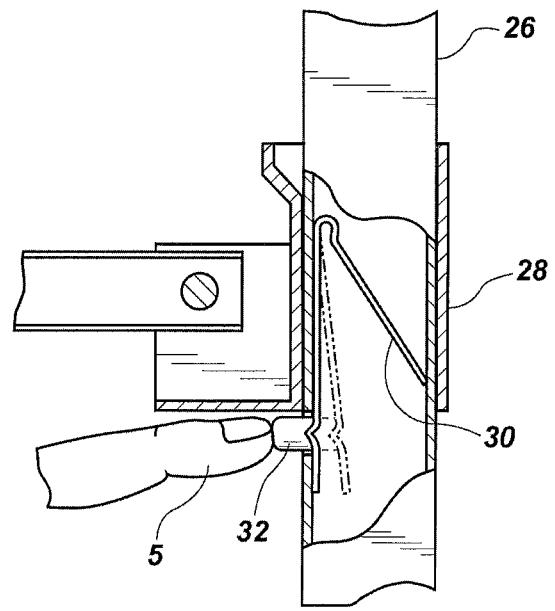
FIG. 2 is a side view in cross section illustrating a prior art slide fitting retained in position with a prior art detent button.

Slide fitting 52 also includes a mounting arm 506 which supports end portion 408 of first truss member 402. Truss member 402 is attached to mounting arm 506 with a suitable fastener 510, such as an Allen bolt or hex head bolt. As shown in FIG. 4, the detent actuator 70 is attached to the canopy with the same fastener 510 which is used to connect first truss member 402 to mounting arm 506, although a separate connector may be used. Thus, detent actuator 70 is, in this case, mounted concentrically with truss member 402. In other words, both truss member 402 and detent actuator 70 rotate about the same axis. However, it should be appreciated that the detent actuator may have a separate pivot axis on the mounting arm or truss member, for example. It can be seen in FIG. 4 that detent actuator 70 provides an interface between a user's thumb 7 and detent button 60. Accordingly, the interface prevents a user's finger from entering the juncture between slide fitting 52 and detent button 60 and the associated aperture 410. Moreover, the use of actuator 70 is likely more comfortable than depressing the detent button 60 directly with a finger. While the detent actuator 70 is described in the exemplary embodiments with respect to a canopy slide fitting, the detent actuator may also be applied to other structures and devices which incorporate detent buttons as a connecting or holding device. Moreover, it should be appreciated that the detent actuator may be used with other types of detents than those shown herein. For example, the detent actuator would work with a detent button that is activated by a compression spring rather than the springs shown in FIGS. 1 and 2.

While not shown, it would be possible to extend actuator 70 such that an arm of the actuator would extend in both directions from the axis of rotation. This would allow actuation by pulling a lever instead of pushing an interface.

Figure 5:
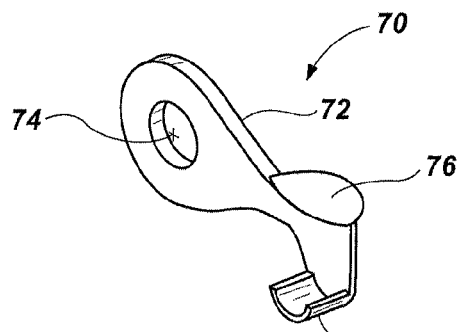
FIG. 5 is a perspective view of the detent actuator shown in FIGS. 3 and 4.
Figure 9:
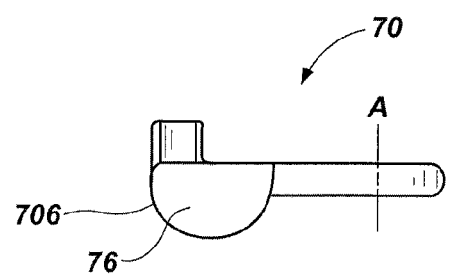
FIG. 9 is a top plan view of the detent actuator.
Figure 6:
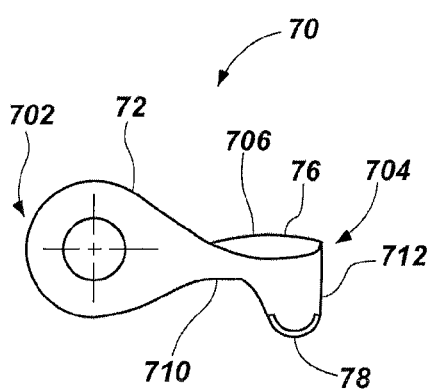
FIG. 6 is a left side view in elevation of the detent actuator shown in FIG. 5.
Figure 7:
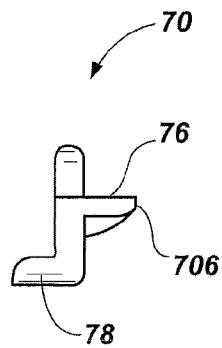
FIG. 7 is a front side view in elevation of the detent actuator.

As shown in FIG. 5, detent actuator 70 includes an elongated arm 72 which includes an aperture 74 through which the detent actuator may be mounted adjacent a detent button, such as on the above-described canopy slide fitting. Detent actuator 70 also includes a finger-receiving region 76 and a button actuating surface 78. With further reference to FIGS. 6-10, elongated arm 72 includes opposed first and second end portions 702 and 704, respectively. In this case, a neck region 710 is formed between the first and second end portions 702 and 704. First end portion 702 includes aperture 74 formed therethrough. Second end portion 704 includes finger-receiving region 76. In this case, finger-receiving region 76 is in the form of a semi-circular, concave finger pad 706. As shown in, for example, FIG. 9, finger pad 706 extends laterally from arm 72. It should be understood that while this embodiment is described as having particular structures, such as semi-circular finger pad 706, other structures may be used as well. For example, finger-receiving region 76 may comprise a finger pad in the form of a fully circular round pad. Moreover, a pad or resilient material may be added to the surface of finger-receiving region 76 for comfort.

Second end portion 704 includes a nose portion 712 which extends downward or away from the finger pad 706. In this case, button actuating surface 78 is disposed on nose portion 712. Button actuating surface 78 is, in this case, in the form of a tab 708 which extends laterally from nose portion 712 in a direction opposite that of thumb pad 706. More specifically, tab 708 extends in a direction that is generally parallel to axis A of aperture 74. In this case, tab 708 includes an arcuate outer button actuation surface 78 for pushing against a detent button.

Figure 8:
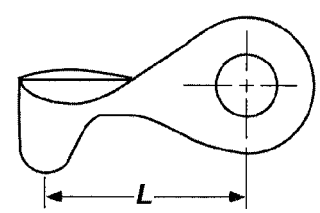
FIG. 8 is a right side view in elevation of the detent actuator.
Figure 10:
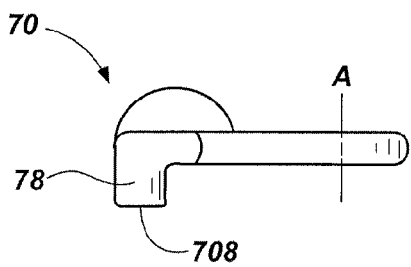
FIG. 10 is a bottom plan view of the detent actuator.

With reference again to FIG. 4, it can be appreciated that detent actuator 70 may be sized such that arm 72 extends from the fastener 510 whereby button actuating surface 78 confronts button 60. In this instance, length L, as shown in FIG. 8, is selected such that button actuating surface 78 confronts button 60 off center of the button, whereby button actuating surface 78 remains in contact with button 60 as it rotates about its pivot axis A and as button 60 is depressed. Accordingly, in this case, button actuating surface 78 acts as a cam surface to push button 60 as the user rotates the detent actuator 70 about axis A. In one embodiment, distance L is approximately one inch; however, the length of the actuator may vary depending on the application.

Although the exemplary embodiment described herein illustrates the detent actuator as having an aperture 74 for mounting to the slide fitting, the detent actuator could instead include a stud or threaded stud portion for attachment to various devices. For example, in FIG. 4, the fastener 510, illustrated as a screw, could be replaced with a detent actuator having a threaded stud portion that extends through both truss members 402 and mounting arm 506.

The detent actuator may be comprised of various materials. For example, it could be a plastic material which is either machined or molded, such as ABS. Alternatively, the detent actuator may be machined from metal such as aluminum or steel. Furthermore, the detent actuator could be cast or stamped from various metals or materials and made from other manufacturing techniques as are known in the art.

Accordingly, the detent actuator and canopy incorporating the same have been described with some degree of particularity directed to the exemplary embodiments. It should be appreciated, though, that modifications or changes may be made to the exemplary embodiments without departing from the inventive concepts contained herein.

What is claimed is:
1. A detent actuator, comprising:
an elongate arm member having a first end portion and a second end portion;
a detent button actuating surface located on the second end portion of the elongate arm, wherein the detent button actuating surface is sized and configured to actuate a detent button;
a receiving region located on the second end portion of the elongate arm opposite the detent button actuating sur- face, wherein the receiving region is sized and configured to receive at least one of a finger and a thumb; and
a mounting structure located on the first end portion of the elongate arm, the mounting structure sized and configured to facilitate mounting of the elongate arm to a fitting member that is selectively slidable relative to a post comprising the detent button, wherein the first end portion of the elongate arm is directly pivotably coupled to a truss member.

2. The detent actuator of claim 1, wherein the mounting structure comprises an aperture sized and configured to receive a fastener therethrough.

3. The detent actuator of claim 2, wherein the detent button actuating surface comprises a tab that extends laterally from the second end portion of the elongate arm in a direction that is generally parallel to an axis of the aperture of the mounting structure.

4. The detent actuator of claim 3, wherein the receiving region comprises a thumb pad that extends laterally from the second end portion of the elongate arm in a direction that is both generally parallel to the axis of the aperture of the mounting structure and opposite the direction that the tab extends.

5. The detent actuator of claim 1, wherein the receiving region comprises a semi-circular, concave finger pad.

6. The detent actuator of claim 1, further comprising a resilient material positioned on the receiving region.

7. A foldable apparatus, comprising:
a post comprising a detent button extending therefrom;
a fitting slidably coupled to the post;
a truss member coupled to the fitting;
a detent button actuator coupled to the fitting, the detent button actuator comprising:
an elongate arm member having a first end portion and a second end portion;
a detent button actuating surface located on the second end portion of the elongate arm, wherein the detent button actuating surface is sized and configured to actuate a detent button; and
a receiving region located on the second end portion of the elongate arm opposite the detent button actuating surface, wherein the receiving region is sized and configured to receive at least one of a finger and a thumb;
wherein the first end portion of the detent button actuator is rotatably coupled directly to the truss member.

8. The foldable apparatus of claim 7, wherein the first end portion of the detent button actuator is rotatably coupled to the fitting.

9. The foldable apparatus of claim 8, wherein the receiving region is located on a first side of the second end portion of the elongate arm and the detent button actuating surface is located on a second side of the second end portion of the elongate arm.

10. The foldable apparatus of claim 7, wherein the detent button actuator comprises an aperture having a fastener positioned therethrough and coupling the detent button actuator to the fitting.

11. The foldable apparatus of claim 10, wherein the detent button actuating surface comprises a tab that extends laterally from the second end portion of the elongate arm in a direction that is generally parallel to an axis of the aperture of the detent button actuator.

12. The foldable apparatus of claim 11, wherein the receiving region comprises a thumb pad that extends laterally from the second end portion of the elongate arm in a direction that is both generally parallel to the axis of the aperture of the detent button actuator and opposite the direction that the tab extends.

13. The foldable apparatus of claim 7, wherein the receiving region of the detent button actuator comprises a semi-circular, concave finger pad.

14. The foldable apparatus of claim 7, further comprising a resilient material positioned on the receiving region of the detent button actuator.

15. The foldable apparatus of claim 7, wherein the foldable apparatus is at least one of a lawn furnishing, a table, a canopy, and camping equipment.

16. A collapsible and expandable canopy structure, comprising:
a plurality of corner support posts;
a plurality of expandable and collapsible trusses coupling the plurality of corner support posts, the plurality of expandable and collapsible trusses comprise a first member and a second member, the second member being fixedly coupled to one of the plurality of corner support post at a stationary fitting and the first member being slidably coupled to one of the plurality of corner support posts at a slide fitting;
a detent button actuator coupled to the slide fitting, the detent button actuator comprising:
an elongate arm member having a first end portion and a second end portion;
a detent button actuating surface located on the second end portion of the elongate arm, wherein the detent button actuating surface is sized and configured to actuate a detent button;
a receiving region located on the second end portion of the elongate arm opposite the detent button actuating surface, wherein the receiving region is sized and configured to receive at least one of a finger and a thumb; and
a mounting structure located on the first end portion of the elongate arm, the mounting structure sized and configured to facilitate mounting of the elongate arm to the slide fitting;
wherein the first end portion of the detent button actuator is rotatably coupled directly to the first member.

17. The collapsible and expandable canopy structure of claim 16, wherein the slide fitting comprises a mounting arm and wherein the first member and the detent button actuator are coupled to the mounting arm using a single fastener extending through apertures aligned in the first member and the mounting structure.

18. The collapsible and expandable canopy structure of claim 17, wherein the detent button actuating surface comprises a tab that extends laterally from the second end portion of the elongate arm in a direction that is generally parallel to an axis of the aperture of the mounting structure.

19. A method of operating a detent button, the method comprising:
applying a force to a receiving region of a detent button actuator to rotate the detent button actuator about a fastener coupled to a truss and relative to a fitting slidably coupled to a post comprising the detent button; and
depressing the detent button with a detent button actuating surface of the detent button actuator.

20. A detent actuator, comprising:
an elongate arm member having a first end portion and a second end portion;

a detent button actuating surface located on the second end portion of the elongate arm, wherein the detent button actuating surface is sized and configured to actuate a detent button;

a receiving region located on the second end portion of the elongate arm opposite the detent button actuating surface, wherein the receiving region is sized and configured to receive at least one of a finger and a thumb; and a mounting structure located on the first end portion of the elongate arm, the mounting structure sized and configured to facilitate mounting of the elongate arm to a member that is selectively slidable relative to a post comprising the detent button;

wherein the mounting structure comprises an aperture sized and configured to receive a fastener therethrough; and wherein the detent button actuating surface comprises a tab that extends laterally from the second end portion of the elongate arm in a direction that is generally parallel to an axis of the aperture of the mounting structure.

21. The detent actuator of claim 20, wherein the receiving region comprises a thumb pad that extends laterally from the second end portion of the elongate arm in a direction that is both generally parallel to the axis of the aperture of the mounting structure and opposite the direction that the tab extends.

22. A foldable apparatus, comprising:
a post comprising a detent button extending therefrom;
a fitting slidably coupled to the post;
a detent button actuator coupled to the fitting, the detent button actuator comprising:
an elongate arm member having a first end portion and a second end portion;
a detent button actuating surface located on the second end portion of the elongate arm, wherein the detent button actuating surface is sized and configured to actuate a detent button; and
a receiving region located on the second end portion of the elongate arm opposite the detent button actuating surface, wherein the receiving region is sized and configured to receive at least one of a finger and a thumb;
wherein the detent button actuator comprises an aperture having a fastener positioned therethrough and coupling the detent button actuator to the fitting; and
wherein the detent button actuating surface comprises a tab that extends laterally from the second end portion of the elongate arm in a direction that is generally parallel to an axis of the aperture of the detent button actuator.

23. The foldable apparatus of claim 22, wherein the receiving region comprises a thumb pad that extends laterally from the second end portion of the elongate arm in a direction that is both generally parallel to the axis of the aperture of the detent button actuator and opposite the direction that the tab extends.

24. A collapsible and expandable canopy structure, comprising:
a plurality of corner support posts;
a plurality of expandable and collapsible trusses coupling the plurality of corner support posts, the plurality of expandable and collapsible trusses comprise a first member and a second member, the second member being fixedly coupled to one of the plurality of corner support post at a stationary fitting and the first member being slidably coupled to one of the plurality of corner support posts at a slide fitting;
a detent button actuator coupled to the slide fitting, the detent button actuator comprising:
an elongate arm member having a first end portion and a second end portion;
a detent button actuating surface located on the second end portion of the elongate arm, wherein the detent button actuating surface is sized and configured to actuate a detent button;
a receiving region located on the second end portion of the elongate arm opposite the detent button actuating surface, wherein the receiving region is sized and configured to receive at least one of a finger and a thumb; and
a mounting structure located on the first end portion of the elongate arm, the mounting structure sized and configured to facilitate mounting of the elongate arm to the slide fitting;
wherein the slide fitting comprises a mounting arm and wherein the first member and the detent button actuator are coupled to the mounting arm using a single fastener extending through apertures aligned in the first member and the mounting structure.

25. The collapsible and expandable canopy structure of claim 24, wherein the detent button actuating surface comprises a tab that extends laterally from the second end portion of the elongate arm in a direction that is generally parallel to an axis of the aperture of the mounting structure.

* * * * *